United States Patent [19]

Urban

[11] Patent Number: 5,614,014
[45] Date of Patent: Mar. 25, 1997

[54] PROCESS FOR THE PREPARATION OF QUINACRIDONE PIGMENTS

[75] Inventor: Manfred Urban, Wiesbaden, Germany

[73] Assignee: Hoechst Aktiengesellschaft, Germany

[21] Appl. No.: 384,323

[22] Filed: Feb. 1, 1995

[30] Foreign Application Priority Data

Feb. 3, 1994 [DE] Germany ............... 44 03 231.5

[51] Int. Cl.$^6$ .................................... C08K 5/00
[52] U.S. Cl. .................. 106/495; 106/23 R; 106/493; 106/494; 106/497; 106/498; 106/504
[58] Field of Search ................... 106/493, 494, 106/495, 498, 504, 23 R, 497

[56] References Cited

U.S. PATENT DOCUMENTS

| | | | |
|---|---|---|---|
| 2,821,529 | 1/1958 | Struve | 546/49 |
| 2,969,366 | 1/1961 | Griswold et al. | 546/49 |
| 3,160,510 | 12/1964 | Ehrich | 106/495 |
| 3,793,327 | 2/1974 | Jaffe | 546/56 |
| 3,973,981 | 8/1976 | Miyatake et al. | 106/411 |
| 4,256,507 | 3/1981 | Kranz et al. | 106/495 |
| 4,310,359 | 1/1982 | Ehashi et al. | 106/494 |
| 4,455,173 | 6/1984 | Jaffe | 106/495 |
| 4,758,665 | 7/1988 | Spietschka et al. | 106/504 |
| 4,895,948 | 1/1990 | Jaffe et al. | 546/56 |
| 4,986,852 | 1/1991 | Dietz et al. | 106/498 |
| 5,062,577 | 11/1991 | Schmitt et al. | 241/171 |
| 5,074,918 | 12/1991 | Bäbler | 106/493 |
| 5,207,829 | 5/1993 | Schwab et al. | 106/493 |
| 5,296,034 | 3/1994 | Dietz et al. | 106/412 |
| 5,318,627 | 6/1994 | Dietz et al. | 106/498 |

FOREIGN PATENT DOCUMENTS

| | | |
|---|---|---|
| 0069396 | 1/1983 | European Pat. Off. . |
| 0321919 | 6/1989 | European Pat. Off. . |
| 0408499 | 1/1991 | European Pat. Off. . |
| 0489421 | 6/1992 | European Pat. Off. . |
| 0604895 | 7/1994 | European Pat. Off. . |
| 1374077 | 11/1963 | France . |
| 1137156 | 8/1965 | Germany . |
| 2500509 | 2/1976 | Germany . |
| 2905114 | 3/1981 | Germany . |
| 3106906 | 1/1982 | Germany . |
| 3716587 | 2/1993 | Germany . |
| 900757 | 7/1962 | United Kingdom . |

OTHER PUBLICATIONS

European Search Report No. 95100786.3 –Apr. 19, 1995.

*Primary Examiner*—Mark L. Bell
*Assistant Examiner*—Scott L. Hertzog
*Attorney, Agent, or Firm*—Connolly and Hutz

[57] ABSTRACT

Pigments, mixed-crystal pigments or pigment preparations based on linear, unsubstituted or substituted quinacridones are prepared advantageously by initially wet-milling the coarsely crystalline crude pigments in a liquid aqueous, aqueous-organic or organic medium in a stirred ball mill which is operated at a power density of more than 2.5 kW per liter of milling space and a peripheral stirrer speed of more than 12 m/s under the action of grinding media having a diameter of less than or equal to 0.9 mm, until the desired degree of fine division is reached, and then isolating the resulting pigment in a conventional manner, or subjecting the resulting prepigment to solvent treatment at a temperature of from 50° to 200° C. and then isolating the pigment in a conventional manner.

24 Claims, No Drawings

PROCESS FOR THE PREPARATION OF QUINACRIDONE PIGMENTS

The present invention relates to a particularly environment-friendly and economic process for the preparation of quinacridone pigments. These pigments include linear, unsubstituted and substituted quinacridone pigments and the mixtures, mixed crystals and pigment preparations based on these pigments.

Quinacridone pigments have been known for a long time. For the synthesis of quinacridone pigments there are two methods carried out on the industrial scale. Depending on the method of synthesis the crude pigments are obtained either in finely divided or in coarsely crystalline form. The crude pigments which are obtained in finely divided form require no further fine division prior to the finishing treatment, whereas the crude pigments obtained in coarsely crystalline form must be finely divided prior to the finishing treatment. Examples of such fine-division and finishing processes are acid pasting, dry milling and wet milling. Combinations of these processes are also described. The most important process in the industry is salt grinding.

In order to improve purity and shade it is in some cases necessary to purify the crude pigments prior to fine division, for example by recrystallization with sulfuric acid. Fine division may be followed by a solvent finish.

The conversion of the coarsely crystalline crude pigments into the pigment form is described in numerous instances in the literature:

U.S. Pat. No. 2,829,529 describes a dry milling process for the preparation of quinacridone pigments of the β- and γ-phases. In this process the coarsely crystalline crude pigments are dry-milled in a roll mill with large quantities of salt and the addition of small quantities of solvent. Large quantities of inorganic salts pass into the waste water and nowadays require reprocessing. For this reason, and because of the extremely long milling times, this process is currently uneconomic.

U.S. Pat. No. 3,160,510 describes the preparation of quinacridone mixed-crystal pigments by dry milling of the crude pigment mixture with salt followed by solvent treatment of the separated millbase, or by reprecipitation of the pigment mixtures from sulfuric acid followed by solvent treatment of the dried, finely divided crude pigments. Large quantities of salt or dilute sulfuric acid are produced, which again require reprocessing. For this reason this process has become uneconomic.

U.S. Pat. No. 5,074,918 describes a wet-milling process for the preparation of quinacridone pigments by aqueous bead-milling of the crude pigments, with the addition of micronized waxes. Under the conditions indicated therein, however, the pigments obtained exhibit disadvantages in the color strength achieved.

Pigment dispersing agents for the production of pigment preparations based on quinacridone pigments have been known for a long time.

U.S. Pat. No. 4,986,852 describes the production of pigment preparations based on quinacridone compounds which contain imidazolylmethylene groups.

U.S. Pat. No. 4,310,359 describes the production of pigment preparations based on quinacridone compounds which contain sulfonamido and carboxamido groups.

U.S. Pat. No. 4,256,507 describes the production of pigment preparations based on quinacridone compounds which contain phthalimidomethylene groups.

U.S. Pat. No. 4,455,173 describes the production of quinacridone pigment preparations by dry milling in the presence of small quantities of inorganic salts, followed by roll milling in organic solvents. The two-stage nature of the milling procedure makes this process very laborious. The solvent milling produces large quantities of solvent which, again, require reprocessing.

The object of the present invention was to provide an environment-friendly and cost-effective process for the preparation of quinacridone pigments which overcomes the disadvantages of the prior art.

Surprisingly it has been found that quinacridone pigments having outstanding coloring and rheological properties, high transparency and high color strength can be prepared in a single milling operation and without the addition of salt by wet-milling the crude quinacridone pigments which have been obtained in coarsely crystalline form in the synthesis, or purified subsequently with sulfuric acid, in a liquid aqueous, aqueous-organic or organic medium in a stirred ball mill with high energy density and small grinding media until a specific minimum degree of fine division of the resulting pigment particles is attained, and by working up the resulting millbase suspensions in a conventional manner.

The present invention relates to a process for the preparation of pigments, mixed-crystal pigments or pigment preparations based on linear, unsubstituted or substituted quinacridones which comprises first wet-milling the coarsely crystalline crude pigments in a liquid aqueous, aqueous-organic or organic medium in a stirred ball mill which is operated at a power density of more than 2.5 kW per liter of milling space and a peripheral stirrer speed of more than 12 m/s under the action of grinding media having a diameter of less than or equal to 0.9 mm, until the desired degree of fine division is reached, and then isolating the resulting pigment in a conventional manner, or subjecting the resulting prepigment to solvent treatment at a temperature of from 50° to 200° C. and then isolating the pigment in a conventional manner.

Depending on the nature and physical properties of the crude quinacridone pigments employed, the wet milling operation according to the invention produces either ready-to-use pigments directly or, initially, finely divided prepigments which require solvent treatment at elevated temperatures (solvent finish) in order to be converted to a ready-to-use pigment form. The prepigment can be supplied to the solvent finish operation in the form of the millbase suspension obtained or, if it has been isolated in the meantime, can be supplied to the solvent finish operation after having been taken up again in an organic liquid. The organic liquid is advantageously that in which the solvent finish operation is carried out.

The process according to the invention neatly combines fine division and finishing.

The preparation of these pigments in accordance with the invention necessitates highly efficient milling, and this is achieved by the use of specific embodiments of the stirred ball mills. Examples of stirred ball mills which are suitable for milling to the desired efficiency are those which are designed for batchwise or continuous operation, which have a cylindrical or hollow-cylindrical milling chamber in horizontal or vertical construction, which can be operated at a specific power density of more than 2.5 kW per liter of milling space and whose peripheral stirrer speed is more than 12 m/s. The constructional design ensures that the high milling energy is transferred to the millbase. Examples of mills suitable for this purpose are described in U.S. Pat. No.

4,062,577. If the milling intensity of the mill is too low then the good properties according to the invention, in particular the high color strength and outstanding coloring properties of the pigments, are not achieved. The energy output per unit time by the stirrer mechanism is transmitted to the millbase as disruption energy and as frictional energy in the form of heat. In order safely to dissipate this large quantity of heat it is necessary to take constructional measures to keep the ratio of milling space to milling chamber surface area (cooling area) as low as possible. At high throughputs milling is carried out in circulation and the heat is dissipated to the outside predominantly via the millbase. The grinding media used are balls of zirconium oxide, zirconium mixed oxide, aluminum oxide or quartz with a diameter of less than or equal to 0.9 mm; it is advantageous to use those having a diameter of from 0.2 to 0.9 mm, preferably from 0.3 to 0.5 mm.

When continuous stirred ball mills are used for the fine division, the grinding media are separated from the millbase preferably by centrifugation, so that there is virtually no contact between the separation devices and the grinding media, thus making it possible to a large extent to prevent the separation devices from becoming blocked. In this case the stirred ball mills are operated with a high grinding-media charge. In the case of the continuous stirred ball mills the milling chamber is filled almost completely with grinding media.

The crude pigments employed for the process according to the invention are those obtained from the synthesis, for example the crude pigments of the γ-phase and β-phase which are obtained in accordance with U.S. Pat. No. 2,969,366, the crude pigments based on substituted quinacridones which are obtained in accordance with U.S. Pat. No. 2,821,529, or the crude pigments obtained after sulfuric acid purification in accordance with U.S. Pat. No. 3,793,327.

Those pigments which are of interest in the context of the present invention are coarsely crystalline crude quinacridone pigments which are substituted by halogen atoms and/or by alkyl, carboxamido and/or alkoxy groups. Coarsely crystalline crude quinacridone mixed-crystal pigments are also of interest.

Particular interest is attached to unsubstituted quinacridone, 3,10-dichloroquinacridone, 2,9-dichloroquinacridone, 4,11-dimethylquinacridone, 4,11-dichloroquinacridone, 2,9-dimethylquinacridone, 2,9-dimethoxyquinacridone, 2,9-di-N-methylcarboxamidoquinacridone and 2,9-dimethyl-3,10-dichloroquinacridone.

Depending on the physical state of the crude pigment small quantities of solvent or surfactant can be added to maintain the phase. However, it is also possible to reverse the phase transition which may have taken place during milling at the subsequent finishing stage. Preliminary experiments are necessary in order to determine the appropriate conditions. The critical factors for the physical state of crude pigment are the purity, the crystal size, the crystal quality and the possible formation of mixed crystals. In general, pure and highly crystalline crude pigments require longer milling than impure pigments and those whose crystal lattice is disrupted.

The milling of the invention is carried out in an aqueous medium or—if necessary in order to maintain the phase—in an aqueous medium with the addition of small quantities of solvent (<10% by weight). Milling can also be carried out in an organic medium. The milling is preferably carried out in the alkaline or neutral pH range.

The liquid milling medium used is water; water-miscible $C_1$–$C_8$-alkanols such as methanol, ethanol, n-propanol, isopropanol, n-butanol, tert-butanol, isobutanol, pentanol, hexanol or alkylhexanols; cyclic alkanols such as cyclohexanol; $C_1$–$C_5$-dialkyl ketones such as acetone, diethyl ketone, methyl isobutyl ketone or methyl ethyl ketone; ethers or glycol ethers such as dimethoxyethane, tetrahydrofuran, methylglycol, ethylglycol, butylglycol, ethyldiglycol, methoxypropanol or methoxybutanol; aliphatic carboxamides such as formamide or dimethylformamide; cyclic carboxamides such as N-methylpyrrolidone, valerolactam and caprolactam; heterocyclic bases such as pyridine, morpholine or picoline; and dimethyl sulfoxide, or mixtures of these solvents with water. Particular preference is given to water and to solutions of $C_1$–$C_8$ alcohols in water. For linear, unsubstituted quinacridone pigments of the β-phase aromatic solvents are suitable, examples being aromatic hydrocarbons such as toluene, xylenes or ethylbenzene, and aromatic halogenated hydrocarbons such as chlorobenzene, o-dichlorobenzene, 1,2,4-trichlorobenzene or bromobenzene.

Anionic, cationic and nonionic, especially anionic, surfactants have proven suitable.

In some cases an increase in the temperature to from 50° to 80° C. works to maintain the phases.

The pigment concentration in the millbase depends on the rheology of the suspension. It should be less than or equal to 40% by weight, generally from 10 to 35% by weight and preferably between 10 and 20% by weight.

The duration of milling is dependent on the fineness requirements of the particular area of application, for example the paints, printing or plastics sector. Consequently, the residence time of the millbase in the stirred ball mill depends on the degree of fineness required and is in general between 5 and 60 minutes. It normally runs to a duration of from 5 to 45 minutes, preferably from 10 to 30 minutes.

Milling is carried out at temperatures in the range from 0° to 100° C., advantageously at a temperature of between 10° and 60° C. and preferably at from 20° to 50° C.

In addition to the liquid phase and the crude pigment, the millbase may also contain pigment dispersing agents and/or cationic, anionic or nonionic surfactants and/or defoaming agents or other additives. Pigment preparations are obtained in such cases. The addition of the pigment dispersing agent can be made before, during or after the milling or after the solvent finish, in one or in a plurality of portions. The most suitable point in time must be determined beforehand by guideline experiments. The pigment dispersing agents are preferably added prior to the solvent finish.

The pigment dispersing agents employed are compounds of the formula (I)

$$P\text{---}X_m \qquad (I)$$

in which m is a number from 1 to 4,

P is the m-valent radical of a linear, unsubstituted quinacridone or of a linear 2,9-dimethylquinacridone, where X is a group of the formula (II)

$$\text{---COOM} \qquad (II)$$

or a group of the formula (III)

$$\text{---SO}_3\text{M} \qquad (III)$$

in which M is a hydrogen atom or one equivalent of an alkali metal ion, alkaline earth metal ion or ammonium ion, or X is a group of the formula (IV)

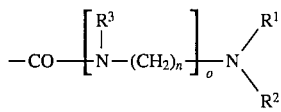

or a group of the formula (V)

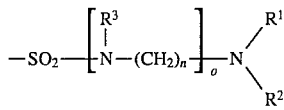

in which $R^1$ and $R^2$ independently of one another are each a hydrogen atom, a $C_1$–$C_{20}$-alkyl, $C_2$–$C_{20}$-alkenyl or $C_5$–$C_7$-cycloalkyl group, or in which $R^1$ and $R^2$ together with the adjacent nitrogen atom form an aliphatic or aromatic five- or six-membered heterocyclic system including in each case from 1 to 3 ring members which are identical or different heteroatoms from the series consisting of nitrogen, oxygen and sulfur, preferably piperidinyl, morpholinyl or pyrrolidinyl, $R^3$ is a hydrogen atom or a $C_1$–$C_4$-alkyl group, n is a number from 1 to 6 and o is the number 0 or 1, or X is the aminomethylene group of the formula (VI)

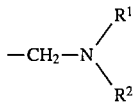

or

X is a group of the formula (VII)

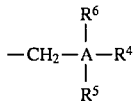

in which A is a five- or six-membered aromatic heterocycle which may be condensed and which comprises from 1 to 3 identical or different heteroatoms from the series consisting of nitrogen, oxygen and sulfur, and the heterocycle is attached to the methylene group via a carbon atom and is preferably imidazolyl, pyrrolyl, thiophenyl or furyl;

$R^6$ and $R^4$ are a hydrogen atom, a $C_1$–$C_4$-alkyl, $C_2$–$C_4$-alkenyl or aryl group, preferably a phenyl group, where $R^6$ and $R^4$ together may form an aliphatic or aromatic ring, preferably benzimidazolyl, thionaphthenyl or indolyl, $R^5$ is a hydrogen atom or a $C_1$–$C_4$-alkyl, $C_1$–$C_3$-hydroxyalkyl or $C_2$–$C_4$-alkenyl group, or X is a group of the formula (VIII)

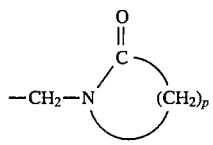

in which p is a number from 3 to 6, or

X is the phthalimidomethylene group (IX)

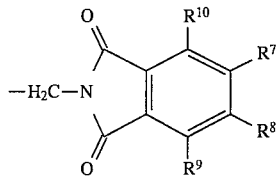

in which $R^{10}$, $R^8$ and $R^9$ are a hydrogen, fluorine, chlorine or bromine atom and $R^7$ is a hydrogen, fluorine, chlorine or bromine atom or a nitro, $C_1$–$C_5$-alkyl, $C_1$–$C_6$-alkoxy or benzoylamino group, or X is the o-sulfobenzimidomethylene group (X)

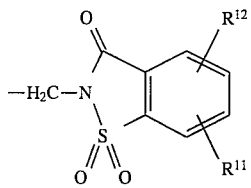

in which $R^{11}$ and $R^{12}$ independently of one another are a hydrogen, chlorine or bromine atom or a $C_1$–$C_4$-alkyl, $C_1C_4$-alkoxy or nitro group, or X is a group of the formula (XI)

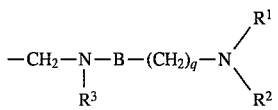

in which B is a carbonyl or sulfonyl group and q is the number 1 or 2, or pigment dispersing agents which comprise in one molecule various of the substituents (II) to (XI) listed above.

The abovementioned pigment dispersing agents are described, for example, in U.S. Pat. No. 3,973,981, U.S. Pat. No. 5,207,829 and EP-A 0 604 895.

Preferred pigment dispersing agents are those of the formula (I) in which P is the radical of linear, unsubstituted quinacridone and X is the phthalimidomethylene group of formula (IX), the imidazolylmethylene group of formula (VII) or the sulfonamido group of formula (V).

The said pigment dispersing agents are added, depending on the specific surface area of the pigment, in quantities of from 0.1 to 25% by weight, advantageously from 1 to 15% by weight and preferably from about 3 to 12% by weight, based on the crude pigment. According to the process they can be added during the actual milling procedure or else not until during the subsequent finishing operation. It is also possible to employ mixtures of pigment dispersing agents having different chemical structures of the formula (I). The pigment dispersing agents primarily have an advantageous action on the flocculation stability and dispersibility of the pigments. However, they may also have a stabilizing effect on the crystal phase.

The millbase suspensions which are present after milling as finely divided pigments are isolated directly. The millbase suspensions which are present after milling as finely divided prepigments are subjected, if desired after addition of the abovementioned pigment dispersing agents in aqueous suspension or, with particular preference, after admixture of organic solvents, to a thermal treatment (solvent finish).

Examples of solvents suitable for such a finish are alicyclic hydrocarbons such as cyclohexane; $C_1$–$C_8$-alkanols and alicyclic alcohols such as methanol, ethanol, nor isopropanol, n- or isobutanol, tert-butanol, pentanols, hexanols and cyclohexanol; $C_1$–$C_5$-dialkyl ketones or cyclic ketones, such as acetone, diethyl ketone, methyl isobutyl ketone, methyl ethyl ketone or cyclohexanone; ethers or glycol ethers, such as the monomethyl or monoethyl ether of ethylene or propylene glycol, butylglycol, ethyldiglycol or methoxybutanol; aromatic hydrocarbons such as toluene, xylenes or ethylbenzenes; cyclic ethers such as tetrahydrofuran; aromatic chlorinated hydrocarbons such as chlorobenzene, o-dichlorobenzene, 1,2,4-trichlorobenzene or bromobenzene; substituted aromatic compounds such as benzoic acid, nitrobenzene or phenol; aliphatic carboxamides such as formamide or dimethylformamide; cyclic carboxamides such as N-methyl-pyrrolidone; $C_1$–$C_4$-alkyl carboxylates such as butyl formate, ethyl acetate or propyl propionate; carboxylic acid $C_1$–$C_4$ glycol esters, $C_1$–$C_4$-alkyl phthalates and $C_1$–$C_4$-alkyl benzoates, such as ethyl benzoate; heterocyclic bases such as pyridine, morpholine or picoline; and dimethyl sulfoxide and sulfolane.

Preferred organic solvents are alkanols, especially ethanol, propanols, butanols and pentanols; aliphatic carboxamides such as formamide or dimethylformamide; cyclic carboxamides, especially N-methylpyrrolidone; and $C_1$–$C_5$-dialkyl ketones or cyclic ketones, especially acetone, diethyl ketone, methyl isobutyl ketone, methyl ethyl ketone or cyclohexanone.

The conditions to be observed when carrying out the solvent finish are to a large extent dependent on the required properties of the pigments and pigment preparations and are in each case tailored to these properties. It is normal for the suspension of the prepigment composition to be treated in the relevant medium at a temperature in the range between 50° and 200° C. under atmospheric or elevated pressure for from 1 to 24 hours. In general, it is the suspension which is obtained after wet milling, without isolation of the millbase, which is employed for this treatment. In this context the quantity of solvent added can be varied within wide limits. It is preferred to use from 1 to 5 times the quantity by weight of solvent, based on the weight of the pigment. The thermal treatment in the aqueous-organic or organic medium is carried out preferably for from 1 to 6 hours at from 50° to 150° C. When the finish operation is at an end the solvents used therein are recovered again by distillation and reused.

Utilizing the abovementioned possibilities for variation which are available and depending on the intended application, the prepigments which are obtained by the process according to the invention can be converted into a more opaque or more transparent form, the opacity or transparency being controllable by way of the solvent power of the particular solvent, its concentration, the temperature selected and the duration of the finishing treatment. The process according to the invention cannot be transferred directly to pigments from other classes because of their different chemical and physical characteristics.

The preparation of pigments based on quinacridones by the process according to the invention has proven particularly economic and also environment-friendly, since the fine division of the crude pigments by wet milling does not result in any dust contamination of the air. Moreover, only small quantities are employed of chemicals and solvents which can subsequently be reprocessed or completely regenerated. There are therefore no waste disposal problems.

It was surprising and not foreseeable that the coarsely crystalline crude quinacridone pigments could be finely divided by wet milling in a single milling operation, since it is normally necessary, for the production of transparent quinacridone pigments of high color strength, to carry out dry milling with the addition of salt followed by wet milling in a roll mill with solvents.

The pigments which can be obtained in accordance with the present invention are distinguished by their outstanding coloring and rheological properties, and in particular by a high flocculation stability, a ready dispersibility, good gloss characteristics and a high color strength.

The pigments prepared in accordance with the invention can be used for the pigmentation of high molecular weight organic materials of natural or synthetic origin.

Examples of high molecular weight organic materials which can be pigmented with the pigments referred to are cellulose ethers end cellulose esters such as ethyl cellulose, nitrocellulose, cellulose acetate or cellulose butyrate, natural resins or synthetic resins such as addition polymerization or condensation resins, for example amino resins, especially urea-formaldehyde and melamine-formaldehyde resins, alkyd resins, acrylic resins, phenolic resins, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

It is not important whether the abovementioned high molecular weight organic compounds are in the form of plastic masses or melts or in the form of spinning solutions, lacquers, paints or printing inks. Depending on the intended application it may prove advantageous to use the pigments, which have been obtained in accordance with the invention, as toners or in the form of preparations or dispersions. The pigments according to the invention are employed in a preferred quantity of from 0.1 to 10% by weight, based on the high molecular weight organic material to be pigmented.

Also suitable are the conventional lacquer systems from the class of the alkyd melamine resin lacquers and two-component lacquers based on polyisocyanate-crosslinkable alkyd and acrylic resins.

To evaluate the properties in the paint sector of the pigments prepared according to the invention a selection was made from the large number of known lacquers of an alkyd-melamine resin lacquer (AM) containing aromatic components and based on a medium-oil non-drying alkyd resin consisting of synthetic fatty acids and phthalic anhydride and of a melamine resin etherified with butanol, and proportions of a non-drying alkyd resin based on ricinoleic acid (short-oil).

In order to evaluate the properties in the plastics sector of the pigments prepared in accordance with the invention, plasticized polyvinyl chloride (PVC) was selected from among the large number of known plastics.

In order to evaluate the properties in the printing sector of the pigments prepared in accordance with the invention, a nitrocellulose-based intaglio printing system (NC print) was selected from among the large number of known printing systems.

The color strength and color were determined in accordance with DIN 55986. The rheology of the milled material after the dispersion (millbase rheology) was evaluated by means of the following five-step scale:

5 highly fluid 4 fluid 3 viscous 2 slightly set 1 set.

After dilution of the millbase to the final pigment concentration, the viscosity was evaluated by means of the Rossmann "Viscospatula", Type 301, from Erichsen.

Gloss measurements were carried out on cast films at an angle of 20° in accordance with DIN 67530 (ASTM D 523) using the "multigloss" glossimeter from Byk-Mallinckrodt.

The crystal phase of the crude pigments, prepigments, pigments, mixed-crystal pigments and pigment preparations was determined by X-ray spectroscopy.

In the examples which follow, the parts and percentages of the substances described are by weight.

EXAMPLE 1

A suspension consisting of 90 parts of water and 10 parts of crude, coarsely crystalline unsubstituted quinacridone pigment (γ-phase) is metered into a stirred ball mill (manufactured by Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction and the solid product is washed with water and dried at 80° C.

9.76 parts are obtained of a pigment (γ-phase with traces of α-phase) which gives transparent coatings of high color strength in the AM lacquer. The viscosity is 3.4 s.

EXAMPLE 2

A suspension consisting of 85 parts of aqueous ethanol (50% strength) and 15 parts of crude, coarsely crystalline unsubstituted quinacridone pigment (γ-phase) is metered into a stirred ball mill (manufactured by Draiswerke GmbH, Mannheim) filled with 336 parts of zirconium mixed-oxide beads of diameter 0.3 to 0.4 mm as grinding media and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the pigment is washed with water and dried at 80° C.

14.9 parts are obtained of a pigment (γ-phase with traces of α-phase) which gives coatings of high color strength in the AM lacquer. The rheology is assessed as 5. The viscosity is 3.6 s.

EXAMPLE 3

A suspension consisting of 90 parts of aqueous dimethylformamide (10% strength) and 10 parts of crude, coarsely crystalline unsubstituted quinacridone pigment (γ-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peri-pheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the solid product is washed with water and dried at 80° C.

9.90 parts are obtained of a pigment (γ-phase with traces of α-phase) which gives coatings of high color strength in the AM lacquer. The viscosity is 6.8 s.

EXAMPLE 4

A suspension consisting of 90 parts of water and 10 parts of crude, coarsely crystalline quinacridone pigment (γ-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peri-pheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the solid product is washed with water.

For the finishing operation the filter-cake is taken up in 50 parts of water, and 20 parts of dimethylformamide and 2.0 parts of the pigment dispersing agent of the formula (I) are added. In this formula (I) P is the radical of linear, unsubstituted quinacridone and X is the phthalimidomethylene group (IX) in which $R^{10}$, $R^7$, $R^8$ and $R^9$ are each a hydrogen atom and m is the number 1.7. Then 20 parts of dimethylformamide are added and the mixture is stirred at boiling temperature for 3 hours. After cooling to 60° C. the pigment preparation is filtered off with suction and the solid product is washed with water until free from dimethylformamide and dried at 80° C.

11.9 parts are obtained of a pigment preparation (γ-phase) which gives coatings of high color strength in the AM lacquer. The rheology is assessed as 4 to 5. The viscosity is 3.8 s.

EXAMPLE 5

A suspension consisting of 90 parts of water and 10 parts of crude, coarsely crystalline quinacridone pigment (γ-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the solid product is washed with water.

For the finishing operation the filter-cake is taken up in 50 parts of water, and—in succession—0.2 part of the sodium salt of a fatty acid tauride based on a naturally occurring fatty acid having from 11 to 13 carbon atoms (content of active substance 50%, the remainder comprising synthesis salt, predominantly sodium sulfate) and 20 parts of dimethylformamide are added. The mixture is then stirred at boiling temperature for 3 hours. After cooling to 60° C. a pH of from 3 to 4 is established by addition of 98% strength formic acid and the mixture is stirred at 60° C. for 1 hour. Then the pigment is filtered off with suction, washed with water until free from dimethylformamide, and dried at 80° C.

9.9 parts are obtained of a pigment (γ-phase) which gives coatings of high color strength in the AM lacquer. The rheology is assessed as 4 to 5. The viscosity is 3.4 s.

EXAMPLE 6

A suspension consisting of 90 parts of water and 10 parts of crude, coarsely crystalline unsubstituted quinacridone pigment (β-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the pigment is washed with water and dried at 80° C.

10.0 parts are obtained of a pigment (β-phase with traces of α-phase) which gives coatings of high color strength in the AM lacquer. The rheology is assessed as 5. The viscosity is 3.2 s.

COMPARISON EXAMPLE 6a

If the crude pigment employed above is milled under the conditions described in Example 10 of U.S. Pat. No. 5,074,918 in a bead mill with a disc stirrer mechanism and quartz beads of diameter 1 mm at a peripheral stirrer speed of 10.2 m/s for 30 minutes and then worked up, the resulting pigment (β-phase with traces of α-phase) in the AM lacquer has a 57% reduced color strength and is significantly duller than the pigment prepared in accordance with the invention.

EXAMPLE 7

A suspension consisting of 85.5 parts of water, 3.6 parts of isobutanol (100%), 0.9 part of caustic soda and 10 parts of crude, coarsely crystalline unsubstituted quinacridone pigment (β-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the pigment is washed with water until neutral and free from isobutanol, and dried at 80° C.

9.34 parts are obtained of a pigment (β-phase with traces of α-phase) which gives coatings of high color strength in the AM lacquer.

EXAMPLE 8

A suspension consisting of 89 parts of water, 1 part of xylene and 10 parts of crude, coarsely crystalline unsubstituted quinacridone pigment (β-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, and the millbase suspensions are combined. The xylene is then distilled off by passing in steam at 100° C. After cooling to 60° C. the pigment is filtered off with suction, washed with water and dried at 80° C. 9.60 parts are obtained of a pigment (β-phase) which gives coatings of high color strength in the AM lacquer.

EXAMPLE 9

A suspension consisting of 90 parts of water and 10 parts of crude, coarsely crystalline unsubstituted quinacridone pigment (β-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the solid product is washed with water.

For the finishing operation, the filter-cake is taken up in 70 parts of water, and 30 parts of isobutanol (100%) and 1.0 part of caustic soda are added. The mixture is heated to 150° C. and stirred at 150° C. for 5 hours. After cooling to 80° C., 0.5 part of pigment dispersing agent of the formula (I) is added. In this formula (I) P is the radical of linear unsubstituted quinacridone and X is the sulfonamido group (V) in which $R^3$ is a hydrogen atom, $R^1$ and $R^2$ are each an ethyl group, n is the number 3, o is the number 1 and m is the number 2.0.

The isobutanol is then distilled off azeotropically by heating at up to 100° C. at the bridge. After cooling to 60° C. the pigment preparation is filtered with suction and the solid product is washed with water and dried at 80° C.

10.0 parts are obtained of a pigment preparation (β-phase) which gives high-hiding coatings in the AM lacquer. In PVC, readily dispersible colorations of high color strength and complete fastness to bleeding are obtained.

EXAMPLE 10

A suspension consisting of 90 parts of water and 10 parts of crude, coarsely crystalline 2,9-dimethylquinacridone pigment is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction, and the pigment is washed with water and dried at 80° C.

9.60 parts are obtained of a pigment which gives coatings of high color strength in the AM lacquer. The viscosity is 6.4 s.

EXAMPLE 11

A suspension consisting of 90 parts of water and 10 parts of crude, coarsely crystalline 2,9-dimethylquinacridone pigment is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with water, the combined millbase suspensions are filtered with suction, and the solid product is washed with water.

For the finishing operation, the filter-cake is taken up in 80 parts of water, and 30 parts of isobutanol and 1.2 parts of the pigment dispersing agent of the formula (I) as a 40.6% water-moist presscake are added. In this formula (I) P is the radical of linear unsubstituted quinacridone and X is the methylenelactam group (VIII) in which p is the number 5 and m is the number 2.5. The mixture is then heated to boiling and stirred at boiling temperature for 3 hours, and the isobutanol is distilled off azeotropically by heating at up to 100° C. at the bridge. After cooling to 60° C., the pigment preparation is filtered off with suction and the pigment is washed with water and dried at 80° C.

10.4 parts are obtained of a pigment preparation which gives coatings of high color strength in the AM lacquer. The rheology is assessed as 5. The viscosity is 3.5 s and the gloss measurement gives a value of 75.

EXAMPLE 12

A suspension consisting of 90 parts of acetone and 10 parts of crude, coarsely crystalline 2,9-dimethylquinacridone pigment is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with acetone, and the combined millbase suspensions are stirred at boiling temperature for 3 hours. The pigment suspension is then evaporated to dryness.

9.20 parts are obtained of a pigment which gives NC prints of high gloss and high color strength.

EXAMPLE 13

A suspension consisting of 90 parts of water, 9 parts of crude, coarsely crystalline 2,9-dimethylquinacridone pigment and I part of the pigment dispersing agent of the formula (I) is metered into a stirred ball mill (manufactured by Draiswerke GmbH, Mannheim) filled with 336 parts of zirconium mixed-oxide beads of diameter 0.3 to 0.4mm as grinding media. In this formula (I) P is the radical of linear, unsubstituted quinacridone and X is the group (VII) in which A is the imidazolyl radical, $R^6$ is a methyl group, $R^4$ and $R^5$ are each a hydrogen atom and m is the number 1.8. The charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction, and the pigment preparation is washed with water and dried at 80° C.

9.39 parts are obtained of a pigment preparation which gives transparent coatings of high color strength in the AM lacquer. The rheology is assessed as 5. The viscosity is 4.4 s.

EXAMPLE 14

A suspension consisting of 90 parts of dimethylformamide and 10 parts of crude, coarsely crystalline 2,9-dichloroquinacridone pigment (d-phase) is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 30 minutes. The millbase suspension is then screened to remove the grinding media, which are washed with dimethylformamide, and the combined millbase suspensions are stirred at boiling temperature for 3 hours. The pigment suspension is then evaporated to dryness.

7.9 parts are obtained of a pigment (γ-phase) which gives hiding coatings in the AM lacquer. The rheology is assessed as 5. The viscosity is 2.2 s and the gloss measurement gives a value of 80.

EXAMPLE 15

A suspension consisting of 90 parts of water and 10 parts of crude, coarsely crystalline mixed-crystal quinacridone pigment consisting of 80% 2,9-dimethyiquinacridone and 20% unsubstituted linear quinacridone is metered into a stirred ball mill (manufactured by Draiswerke GmbH, Mannheim) filled with 336 parts of zirconium mixed-oxide beads of diameter 0.3 to 0.4 mm as grinding media, and the charge is milled at a peripheral stirrer speed of 15.6 m/s and a specific power density of 3.1 kW per liter of milling space at 25° C. for 10 minutes. The millbase suspension is then screened to remove the grinding media, which are washed with water, the combined millbase suspensions are filtered with suction, and the mixed-crystal pigment is washed with water and dried at 80° C.

9.56 parts are obtained of a mixed-crystal pigment which gives transparent coatings of high color strength in the AM lacquer.

EXAMPLE 16

A suspension consisting of 80 parts of dimethylformamide and 16 parts of crude, coarsely crystalline 2,9-dimethylquinacridone pigment and 4 parts of crude, coarsely crystalline unsubstituted linear quinacridone pigment (α-phase) is metered into a stirred ball mill (manufactured by Draiswerke GmbH, Mannheim) filled with 530 parts of zirconium oxide beads of diameter 0.3 to 0.4 mm as grinding media, and the batch is milled at a peripheral stirrer speed of 15.6 m/s and a specific power density of 3.1 kW per liter of milling space at 25° C. for 30 minutes. The millbase suspension is then screened to remove the grinding media, which are washed with dimethylformamide, and the combined millbase suspensions are stirred at boiling temperature for 3 hours. The mixed-crystal pigment is then filtered off with suction, washed with water until free from dimethylformamide, and dried at 80° C.

17.5 parts are obtained of a mixed-crystal pigment which gives hiding coatings in the AM lacquer. The theology is assessed as 5. The viscosity is 2.6 s.

I claim:
1. A process for the preparation of a pigment, mixed-crystal pigment or pigment preparation based on linear, unsubstituted quinacridones of β-phase or γ-phase, or substituted, linear quinacridones, which comprises:
   initially wet-milling a coarsely crystalline crude pigment in a liquid aqueous, aqueous-organic or organic medium in a stirred ball mill which is operated at a power density of more than 2.5 kW per liter of milling space and a peripheral stirrer speed of more than 12 m/s under the action of grinding media having a diameter of less than or equal to 0.9 mm, until fine division is reached, and then isolating the resulting pigment.
2. The process as claimed in claim 1, wherein grinding media having a diameter of from 0.2 to 0.9 mm are employed.
3. The process as claimed in claim 1, wherein grinding media having a diameter of from 0.3 to 0.5 mm are employed.

4. The process as claimed in claim 1, wherein the pigment concentration in the millbase is less than or equal to 40% by weight.

5. The process as claimed in claim 1, wherein the pigment concentration in the millbase is from 10 to 35% by weight.

6. The process as claimed in claim 1, wherein the pigment concentration in the millbase is from 10 to 20% by weight.

7. The process as claimed in claim 1, wherein the milling liquid is water, a $C_1$–$C_8$-alkanol, toluene, xylene, a $C_1$–$C_5$-dialkyl ketone, an aliphatic carboxamide or a mixture of the liquids mentioned.

8. The process as claimed in claim 1, wherein a crude, coarsely crystalline quinacridone pigment is employed which is substituted by halogen, alkyl, carboxamide, alkoxy groups or by a combination of said groups.

9. The process as claimed in claim 1, wherein unsubstituted quinacridone, 2,9-dimethyl-, 2,9-dichloro-, 3,10-dichloro-4,11-dichloro-or 4,11-dimethylquinacridone is employed.

10. The process as claimed in claim 1, wherein a crude, coarsely crystalline quinacridone mixed-crystal pigment is employed.

11. The process as claimed in claim 1, wherein the wet milling is carried out at a pH in the alkaline range.

12. The process as claimed in claim 1, wherein the solvent treatment is carried out with $C_1$–$C_8$-alkanols in aqueous medium.

13. The process as claimed in claim 1, wherein after wet-milling, the resulting pigment is subjected to a solvent treatment which is carried out with isobutanol in aqueous medium.

14. The process as claimed in claim 1, which comprises adding, at any desired point in time during the course of the process, one or more pigment dispersing agents of the formula (I)

$$P\text{—}X_m \quad (I)$$

in which
m is a number from 1 to 4,
P is the m-valent radical of linear, unsubstituted quinacridone or of linear 2,9-dimethylquinacridone, where
X is a group of the formula (II)

$$\text{—COOM} \quad (II)$$

or a group of the formula (III)

$$\text{—SO}_3\text{M} \quad (III)$$

in which M is a hydrogen atom or one equivalent of an alkali metal ion, alkaline earth metal ion or ammonium ion, or X is a group of the formula (IV)

$$-\text{CO}-\left[\text{N}(\text{R}^3)-(\text{CH}_2)_n\right]_o-\text{N}(\text{R}^1)(\text{R}^2) \quad (IV)$$

or a group of the formula (V)

$$-\text{SO}_2-\left[\text{N}(\text{R}^3)-(\text{CH}_2)_n\right]_o-\text{N}(\text{R}^1)(\text{R}^2) \quad (V)$$

in which $R^1$ and $R^2$ independently of one another are each a hydrogen atom, a $C_1$–$C_{20}$-alkyl, $C_2$–$C_{20}$-alkenyl or $C_5$–$C_7$-cycloalkyl group, or in which $R^1$ and $R^2$ together with the adjacent nitrogen atom form an aliphatic or aromatic five- or six-membered heterocyclic system including in each case from 1 to 3 ring members which are identical or different hetero atoms selected from the group consisting of nitrogen, oxygen and sulfur, $R^3$ is a hydrogen atom or a $C_1$–$C_4$-alkyl group, n is a number from 1 to 6 and o is the number 0 or 1, or X is the aminomethylene group of the formula (VI)

$$-\text{CH}_2-\text{N}(R^1)(R^2) \quad (VI)$$

or

X is a group of the formula (VII)

$$-\text{CH}_2-\underset{R^5}{\overset{R^6}{\text{A}}}-R^4 \quad (VII)$$

in which A is a five- or six-membered aromatic heterocycle which is optionally condensed and which comprises from 1 to 3 identical or different heteroatoms selected from the group consisting of nitrogen, oxygen and sulfur, and the heterocycle is attached to the methylene group via a carbon atom;

$R^6$ and $R^4$ are a hydrogen atom, a $C_1$–$C_4$-alkyl, $C_2$–$C_4$-alkenyl or aryl group, or where $R^6$ and $R^4$ together form an aliphatic or aromatic ring, $R^5$ is a hydrogen atom or a $C_1$–$C_4$-alkyl, $C_1$–$C_3$-hydroxyalkyl or $C_2$–$C_4$-alkenyl group or X is a group of the formula (VIII)

$$-\text{CH}_2-\text{N}\underset{(\text{CH}_2)_p}{\overset{\text{C}=\text{O}}{\diagdown}} \quad (VIII)$$

in which p is a number from 3 to 6, or

X is the phthalimidomethylene group (IX)

(IX) [phthalimidomethylene structure with substituents $R^7$, $R^8$, $R^9$, $R^{10}$]

in which $R^{10}$, $R^8$ and $R^9$ are a hydrogen fluorine chlorine or bromine atom and $R^7$ is a hydrogen, fluorine, chlorine or bromine atom or a nitro, $C_1$–$C_5$-alkyl, $C_1$–$C_6$-alkoxy or benzoylamino group, or X is the o-sulfobenzimidomethylene group (X)

(X) [o-sulfobenzimidomethylene structure with substituents $R^{11}$, $R^{12}$]

in which $R^{11}$ and $R^{12}$ independently of one another are a hydrogen, chlorine or bromine atom or a $C_1$–$C_4$-alkyl, $C_1$–$C_4$-alkoxy or nitro group, or X is a group of the formula (XI)

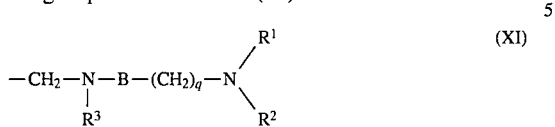 (XI)

in which B is a carbonyl or sulfonyl group and q is the number 1 or 2, or pigment dispersing agents which comprise in one molecule various of the abovementioned substituents (II) to (XI).

15. The process as claimed in claim 14 wherein $R^1$ and $R^2$ together with the adjacent nitrogen atom form a piperidinyl, morpholinyl or pyrrolidinyl ring.

16. The process as claimed in claim 14, wherein in formula (VII) A is a radical of a heterocycle selected from the group consisting of imidazol, pyrrole, thiophene and furan.

17. The process as claimed in claim 14, wherein in formula (VII) $R^6$ and $R^4$ together with A form a benzimidazolyl, thionaphthenyl or indolyl ring.

18. The process as claimed in claim 14, wherein between 0.1 and 25% by weight, of the pigment dispersing agent of the formula (I) is employed, based on the crude pigment employed.

19. The process as claimed in claim 14, wherein from 3 to 12% by weight, of the pigment dispersing agent of the formula (I) is employed, based on the crude pigment employed.

20. A method of pigmenting lacquers, printing inks and plastics comprising the step of incorporating a pigment, mixed-crystal pigment or pigment preparation prepared as claimed in claim 1 into the lacquers, printing inks and plastics to be pigmented.

21. The process as claimed in claim 1, wherein after wet-milling a solvent treatment at a temperature of from 50° to 200° C. is performed.

22. A process for the preparation of a pigment, mixed-crystal pigment or pigment preparation based on linear, unsubstituted quinacridones of β-phase or γ-phase, or substituted, linear quinacridones, which comprises:

initially wet-milling a coarsely crystalline crude pigment in a liquid aqueous or aqueous-organic medium in a stirred ball mill which is operated at a power density of more than 2.5 kW per liter of milling space and a peripheral stirrer speed of more than 12 m/s under the action of grinding media having a diameter of less than or equal to 0.9 mm, until fine division is reached, and then isolating the resulting pigment.

23. The process as claimed in claim 1, wherein after the pigment undergoes wet-milling it is mixed with solvent and is heated at from 50° to 150° C. for from 1 to 6 hours.

24. The process as claimed in claim 1 wherein the pigment is based on linear, unsubstituted quinacridones of β-phase or γ-phase and the pigment prepared is substantially of the same phase as the initial coarsely crystalline crude pigment.

\* \* \* \* \*